United States Patent
Wroblewski et al.

(10) Patent No.: US 7,866,255 B1
(45) Date of Patent: Jan. 11, 2011

(54) BEVERAGE BREWER WITH SPRAY DISTRIBUTION ASSEMBLY AND METHOD

(75) Inventors: Leszak M. Wroblewski, Lake Forest, IL (US); Zbigniew G. Lassota, Long Grove, IL (US)

(73) Assignee: Food Equipment Technologies Company, Inc., Lake Zurich, IL (US)

( * ) Notice: Subject to any disclaimer, the term of this patent is extended or adjusted under 35 U.S.C. 154(b) by 1154 days.

(21) Appl. No.: 10/849,387

(22) Filed: May 19, 2004

Related U.S. Application Data

(60) Provisional application No. 60/562,066, filed on Apr. 14, 2004, provisional application No. 60/474,088, filed on May 28, 2003.

(51) Int. Cl.
*A47J 31/00* (2006.01)
(52) U.S. Cl. .............................. 99/315; 99/306; 99/307; 426/433
(58) Field of Classification Search ................... 99/315, 99/312, 307, 306, 300, 302 R; 426/433, 426/435
See application file for complete search history.

(56) References Cited

U.S. PATENT DOCUMENTS

| | | | |
|---|---|---|---|
| 3,626,839 A * | 12/1971 | Martin et al. | 99/315 |
| 3,859,902 A * | 1/1975 | Neumann et al. | 99/304 |
| 3,952,642 A * | 4/1976 | Vitous | 99/300 |
| 6,244,162 B1 * | 6/2001 | Dahmen | 99/315 |
| 6,658,989 B2 * | 12/2003 | Sweeney et al. | 99/315 |

* cited by examiner

*Primary Examiner*—Reginald L Alexander
(74) *Attorney, Agent, or Firm*—James W. Potthast; Potthast & Associates

(57) ABSTRACT

A hot beverage brewer (10) having a hot water dispense system (12), a brew basket assembly (18) for holding ingredient to be mixed with the hot water to make a freshly brewed hot beverage and a controller (16) for controlling the delivery of hot water from the hot water dispenser system to the brew basket (18) with a spray distribution assembly (14) having a spray head (20) having a generally vertical passageway (22) for receipt of hot water and a spray plate (38) with a an umbrella-like body (34) with a downwardly, outwardly tapered top with radiating, outwardly, downwardly directed, upwardly facing grooves and an upwardly standing central core (58) snuggly received within the passageway (22) joined to the top of the umbrella-like member (34) with a plurality of radially, outwardly facing grooves (68) extending from the top to the bottom to form a plurality of peripheral closed channels for passing hot water to upwardly facing grooves (74) of the umbrella-like body. The umbrella-like member (34) has a surrounding outer edge that varies in radial distance from the core around a periphery of the umbrella like body to form a plurality of radially extending pedals (80) separated by a plurality of slots (82). Tooless securing means (32, 60) permits relative rotation of the core within the passageway (22) scrape clean the core and passageway of residue.

34 Claims, 8 Drawing Sheets

BEVERAGE BREWER WITH SPRAY DISTRIBUTION ASSEMBLY AND METHOD

CROSS-REFERENCE TO RELATED APPLICATION

This application claims under 35 USC 119(e) the benefit of U.S. provisional applications Ser. No. 60/474,088, filed May 28, 2003, and Ser. No. 60/562,066, filed Apr. 14, 2004, both of which are hereby incorporated by reference.

BACKGROUND OF THE INVENTION

1. Field of the Invention

This invention generally relates to hot beverage brewers, such as hot coffee brewers and iced tea abstract brewers and hot tea brewers and, more particularly, to such brewers of the type that spray hot water upon ingredient contained within a brew basket to dissolve the ingredient to make the brewed beverage or brewed beverage abstract.

2. Discussion of the Prior Art

Coffee brewers and hot tea abstract brewers or hot tea brewers of the type that have a brew basket within which is contained the beverage ingredient such as ground coffee beans or tea leaves, through which hot water is passed are well know. Examples of such brewers are shown the following U.S. Pat. No. 5,000,082 issued Mar. 19, 1991 to Lassota for "Beverage Maker and Method of Making Beverage" and U.S. Pat. No. 6,148,717 issued Nov. 21, 2000 to Lassota for "Beverage Maker with Intermittent Beverage Liquid Dispenser and Apparatus and Method for Uniform Contact of Brew Ingredient with Brew", and reference should be made to these patents and the patents cited therein for details of the construction and operation of such brewers.

Briefly, in most of such brewers the hot water is passed through a spray head in the form of a cup shaped container with a closed top for receipt of hot water from a hot water tank and a flat, circular bottom spray plate containing an array of spray holes. The spray plate in known brewers is made of stainless steel. The hot water passes through the array of spray holes to cumulatively create a hot water spray, or shower, that falls on the top surface of a ingredient contained within the brew basket and then seeps through and partially dissolves the ingredient to form the freshly brewed beverage.

Due to the presence of lime, in various mineral forms and other minerals and mineral compounds, such as iron, dissolved in the hot water and the evaporation of the hot water in contact with the top and bottom surfaces of the spray plate and the inlets, outlets and side surfaces of the spray holes, calcium oxide, calcium sulfate, magnesium sulfate, calcium silicate and magnesium silicate and other mineral deposits build up on these surfaces and over time can clog entirely or partially obstruct the spray holes. Such residue build up is referred to as "liming".

Even if the spray holes are only partially obstructed, the time it takes for a given quantity of hot water to pass through the spray plate is increased as compared to when there is no obstruction. In some brewers, in which the total quantity of hot water is predetermined and simply drained or "dumped" through the spray head, the total quantity is not effected by the liming but the total length of time for dispensing the hot water is increased and thus the duration of the brew cycle is increased.

In other brewers, in which the selected quantity of hot water is measured by passing the water at a presumed uniform rate for a pre-selected dispense time period, the dispenser period will not necessarily be altered by spray hole partial or complete clogging from liming will not necessarily change the dispense time period but can result in a reduction of the total quantity of hot water dispensed and a consequential alteration in the strength of the brewed beverage.

In either event, the "throughput", i.e. the total quantity of coffee that can be made over a given time period using successive brew cycles is reduced. In addition, the degree of control over the hot water dispense time period and the total quantity of hot water dispensed that is needed for production of brewed beverage of uniform and preselected characteristics is lost. Ultimately, if the spray plate is not cleaned of the liming residue, the entire array of spray holes can become so clogged that the brewer will not function.

This liming problem has been addressed by attempting to reduce the quantity of calcium and other minerals dissolved in the water before it is passed through the spray head by means of lime and mineral commutation systems or reduction systems. While such dissolved mineral reduction reduces the rate of liming accumulation, it also requires the extra costs of purchase, maintenance and chemical supply replenishment for operation of the mineral commutation system, and if not all the liming and mineral deposits problems are removed from the water, liming residue accumulation will be reduced but not eliminated.

In the absence of a lime and mineral reduction and depending upon the level of dissolved calcium and other mineral compounds in the hot water, the only other solution to the liming problem has been frequent, routine, sometimes even daily, mechanical brushing or other cleaning of the spray plate to remove the calcium deposits from within and around the spray holes. Such cleaning is labor intensive and disables the brewer from operation during the cleaning. In addition, removal of the spray plate generally requires the use of tools to disassembly the plate from the spray head body.

Another problem with know spray head assemblies is that the velocity of the water droplets onto the top surface of the ingredient in the brew basket is directly related to the water pressure from the hot water dispense system and may impact the surface of the ingredient with sufficiently high impact energy to disadvantageously mechanically disturb the layer of ingredient and create undesirable splatter.

SUMMARY OF THE INVENTION

It is therefore an object of the invention to provide a brewer assembly having a spray distribution assembly that overcomes or reduces the problems noted above with respect known spray head assemblies.

This objective is achieved in part by providing a beverage brewer having a source of hot water, a hot water dispense system, a brew basket for holding ingredient to be mixed with the hot water to make a freshly brewed hot beverage and a controller for controlling the delivery of hot water from the hot Water dispenser system to the brew basket with a spray distribution assembly having a spray head having a generally vertical passageway connectable with the hot water dispense system for receipt of hot water; and a spray plate with a an umbrella-like body with a downwardly, outwardly tapered top with radiating, outwardly, downwardly directed, upwardly facing grooves, and an upwardly standing central core snuggly received within the passageway, said core having an upwardly facing top, a bottom joined to the top of the umbrella-like body and a plurality of radially, outwardly facing grooves extending from the top to the bottom to form a plurality of peripheral closed channels for passing hot water from the top of the core to the top surface of the umbrella-like body.

Preferably, the plurality of channels of the core is joined with at least one of the grooves of the umbrella-like body and at least one of the plurality of channels of the core is joined with a plurality of upwardly facing grooves. In the preferred embodiment, the umbrella-like body has a surrounding outer edge that varies in radial distance from the core around a periphery of the umbrella-like body, preferably in the form of a plurality of radially extending pedals separated by a plurality of slots. All the plurality of upwardly facing grooves of the umbrella-like body extend from an inlet at the core to a distal outlet from which water passes out of the groove, and some of the upwardly facing grooves of the umbrella-like body have a length that is different from the length of some other upwardly facing grooves.

Preferably, the umbrella-like body has an upwardly facing surface that has a downwardly, outwardly curved surface with a downward taper that is greater at a distance spaced from the core than that adjacent to the core, and the spray head has a downwardly, outwardly extending wall with a peripheral edge joinable to the periphery of an open top of a brew basket and surrounding the umbrella-like body in spaced relationship. The spray head has a downwardly, outwardly extending wall with a periphery having a width that may be on the order of two times that of a widest dimension of the umbrella-like body.

In keeping with one aspect of the invention spray head and the spray plate respectively carry mating connector means for releasable tooless securing of the central core within the passageway. Such connector means may include a magnetic material for magnetically securing together the spray head and the spray plate. The outwardly facing grooves of the core have edges and the passageway has a relatively smooth, cylindrical surface. The tooless securing means permits relative rotation of the core within the passageway, and in order to clean the core and passageway of residue all that is required is to rotate the core back and forth within the passageway to scrape the edges of the outwardly facing grooves against the interior surface of the passageway to remove liming residue without removal of the core from within the passageway.

The spray head has a wall surrounding an inlet to the passageway to define a water cavity and means for permanently connecting the hot water dispenser system to the water cavity to provide fill the cavity with water and means for selectively closing the inlet. The passageway has an inlet and the spray head has means for attachment of a solenoid-controlled valve with a movable closure member for selectively closing and opening the inlet to the passageway. The passageway has a sidewall surrounding the passageway and a water inlet in the sidewall for receipt of water from the hot water dispense system into the water cavity.

The objective is also obtained in part by provision a method of spray distribution for use in a beverage brewer having a source of hot water, a hot water dispense system, a brew basket for holding ingredient to be mixed with the hot water to make a freshly brewed hot beverage and a controller for controlling the delivery of hot water from the hot water dispenser system to the brew basket by performance of the steps of connecting a spray head having a passageway connected with the hot water dispense system for receipt of hot water and having an interior surface, and passing the received hot water to a spray plate with an umbrella-like body having an upwardly, inwardly tapered top with radiating, upwardly facing grooves through a plurality of radially, outwardly facing grooves formed in an upwardly standing central core, said central core being snuggly received within the passageway to form water channels defined by the outwardly facing and the interior surface of the passageway, said core having an upwardly facing top, a bottom joined to the top of the umbrella-like body and the plurality of radially, outwardly facing grooves extend from the top to the bottom to form a plurality of peripheral closed channels for passing hot water from the top of the core to the top surface of the umbrella-like body.

Additionally the objective is achieved by provision of a method of distributing hot water onto a layer of beverage ingredient within a brew basket by performance of the steps of passing hot water to a water distribution plate through passageways that are formed of two parts that may be separated for purposes of cleaning interiors, passing hot water passed to the water distribution plate onto a beverage ingredient within a brew basket along at least one of one of (a) open, upwardly facing channels, (b) closed passageways that are formed of two parts that may be separated for purposes of cleaning; (c) contours of a surface that is downwardly, outwardly tapered, (d) contours of a surface that is convex, (e) contours of a surface that tapers downwardly at an increasing taper as the distance from a central location increases, (f) a segmented surface with elongate segments separated by relatively shorter segments that are joined to and between the elongate segments, and (g) grooves on a surface that terminate at different radial distances from a central core.

The object of the invention is also acquired by providing a method of cleaning beverage making beverage making residue from a hot water spray distribution assembly of a hot beverage brewer by performing the steps of rotatably mounting one spray distribution member to another, complementary spray distribution member, and rotating the one spray distribution member relative to the other spray distribution member to scrape residue off of at least one of the one distribution member and the other distribution member. The spray distribution member has a plurality of edges that scrape against the other distribution member during relative rotation, and preferably edges are the edges of elongate water-carrying channels.

Obtainment of the objective, in part is also obtained by providing a method of distributing hot water onto a layer of beverage ingredient within a brew basket by performing the steps of filling a water cavity with hot water from a hot water dispensing system, selectively opening an inlet to a passageway to pass hot water from the water cavity through the passageway, receiving the hot water onto a central portion of a downwardly, outwardly tapered, top surface of a plate, and passing the hot water downwardly and outwardly along the top surface to a peripheral edge of the top surface.

BRIEF DESCRIPTION OF THE DRAWINGS

The foregoing objects and advantageous features of the invention will be described below and other advantageous features will be made apparent from a detailed description of a preferred embodiment of the invention in which.

DETAILED DESCRIPTION

Figure 1:
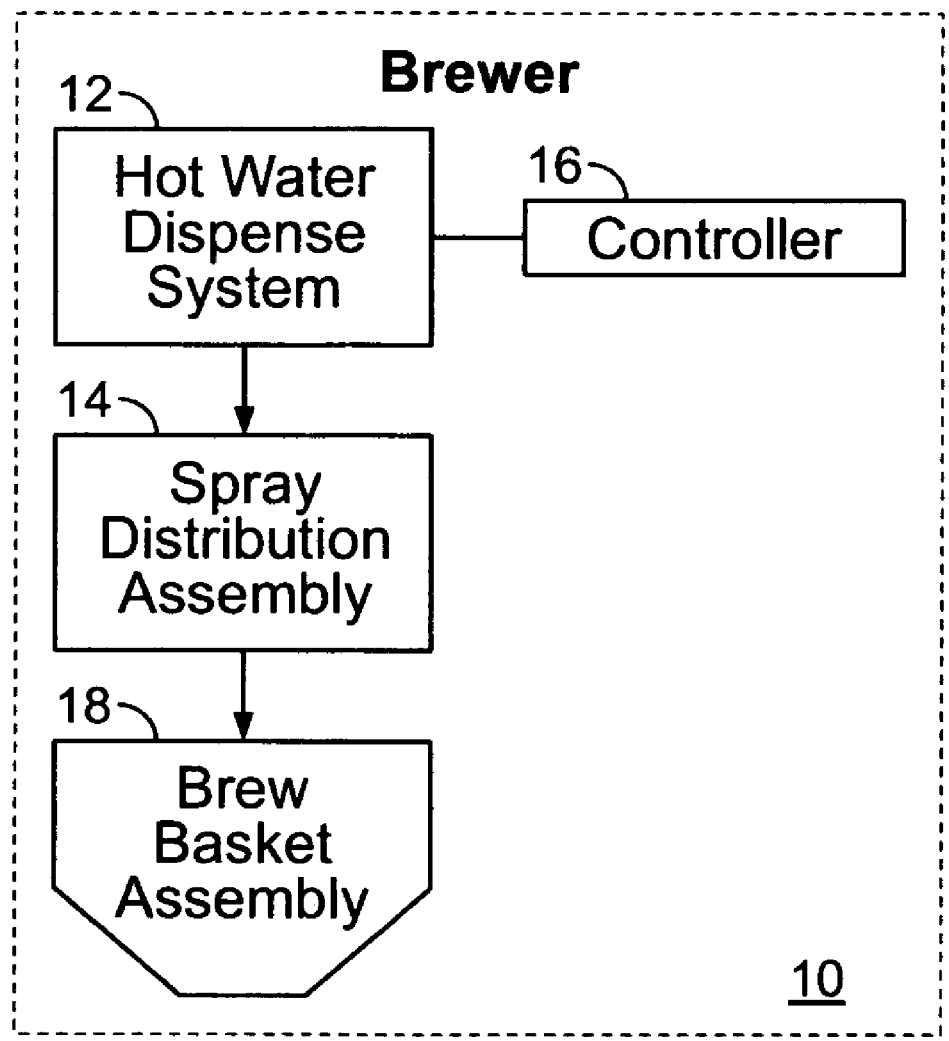
FIG. 1 is a functional block diagram of a brewer constructed in accordance with the invention.

Referring to FIG. 1, a preferred embodiment of the hot beverage brewer 10 of the present invention seen to have a hot water dispense system 12 that selectively passes hot water from a hot water tank to a spray distribution assembly 14 under control of a controller 16. The hot water is passed from the spray distribution assembly 14 to the brew basket assembly 18. The brew basket assembly 18 has an internal filter holder that contains the beverage ingredient while hot water is passed through the ingredient to brew the hot beverage, such as hot coffee or tea, or hot tea extract used to make iced tea. The hot beverage or extract is then passed through a drain hole at the bottom of the brew basket 14 into a suitable beverage container. In the case of an iced tea brewer, cold water is also added to the beverage container and mixes with the abstract.

The hot water dispense system 12, the controller 16 and the brew basket assembly are well know in their structures and functions and may be conventional. If further information is desired, examples of brewers may be seen in U.S. Pat. No. 5,000,082 issued Mar. 19, 1991 to Lassota for "Beverage Maker and Method of Making Beverage"; U.S. Pat. No. 6,148,717 issued Nov. 21, 2000 to Lassota for "Beverage Maker with Intermittent Beverage Liquid Dispenser and Apparatus and Method for Uniform Contact of Brew Ingredient with Brew"; and U.S. Pat. No. 6,571,685 issued Mar. 30, 2004 to Lassota for "Oxygenated Tea Maker and Method"; and patents cited therein, all of which are hereby incorporated by reference.

Figure 2:
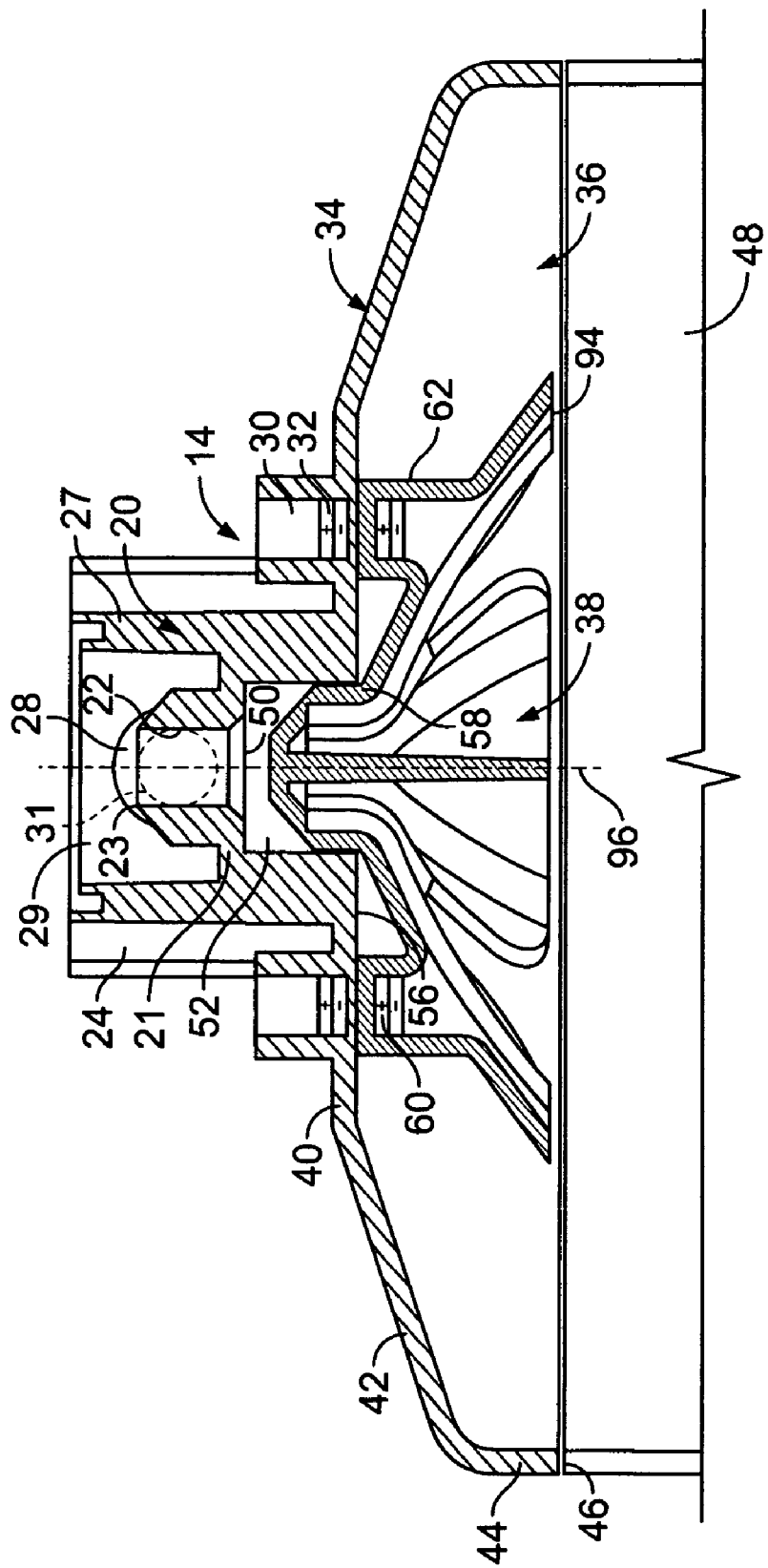
FIG. 2 is a sectional side view of a preferred embodiment of the spray distribution assembly of FIG. 1 in which the spray distribution member is assembled in operative relationship with the spray head to which it is releasably mounted.
Figure 3:
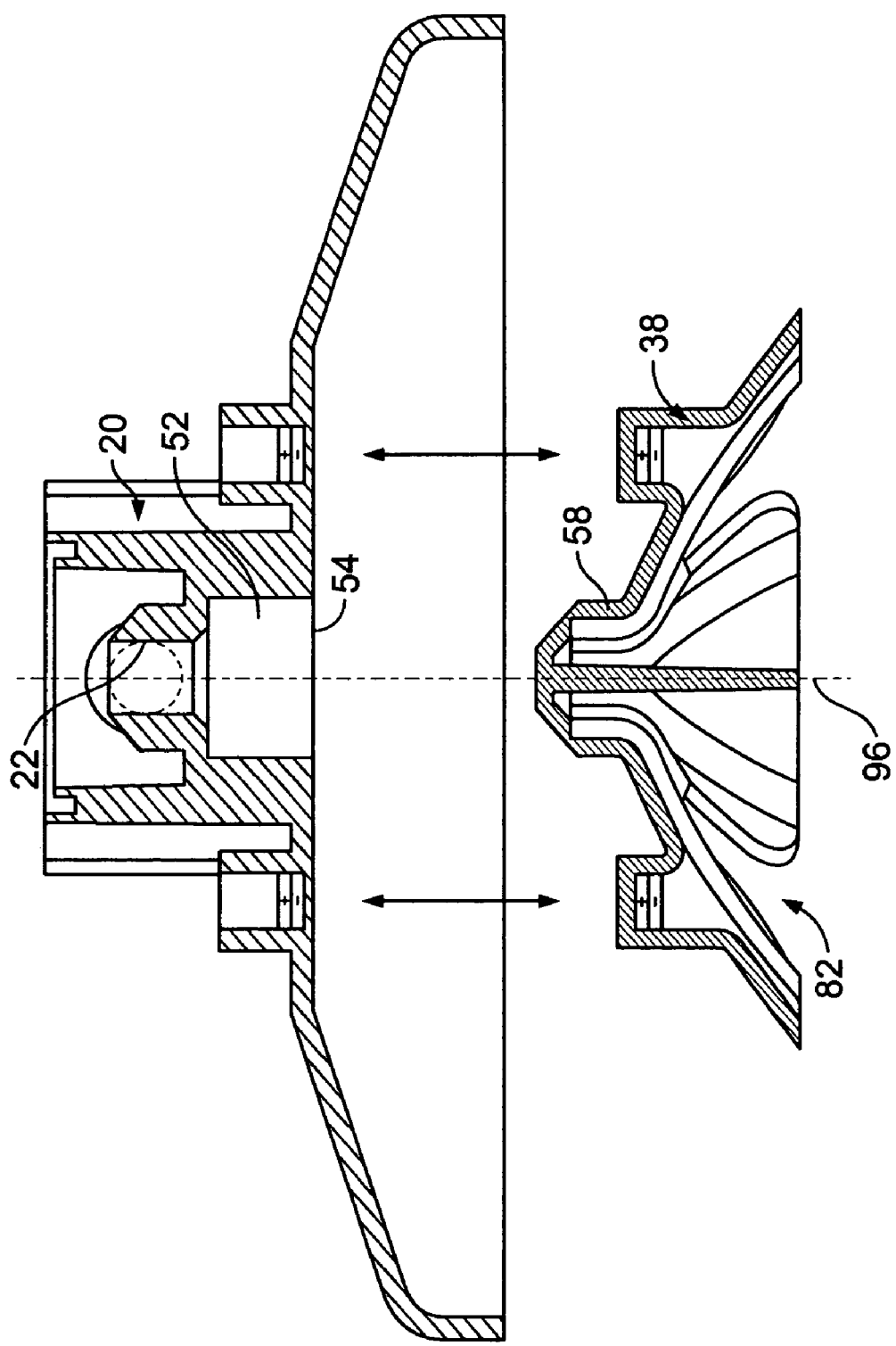
FIG. 3 is a sectional side view similar to that of FIG. 2 but in which the spray distribution member is separated from the spray head for purposes of cleaning.

In accordance with the present invention the spray distribution assembly 14 is provided with novel advantageous features that overcomes the disadvantages of known spray heads or spray head assemblies. Referring to FIGS. 2 and 3, the spray distribution assembly, or spray cutter, 14 includes a cover section, or spray heads assembly, 20 with a central, cylindrical passageway 22 that is connectable to the hot water dispense system 12. The passageway 22 is surrounded by a multi-walled, upstanding annular collar 24 for connection with an interior, upstanding cylindrical wall 21 with a tapered top that ends in a circular, relatively narrow bead 23. The bead 23 is mated with a vertically movably mounted solenoid controlled closure member 108 described below with reference to FIGS. 7 and 8 to selectively close an inlet 28 of the passageway 22. The upstanding collar 24 is surrounded by a cylindrical wall 27 to provide an interior water cavity 29. The interior of the water cavity 29 is filled with hot water via a hot water inlet 31 extending through the cylindrical wall 27 and permanently connected with the hot water dispense system 12. When the closure member 108 is lifted off the bead 23, the inlet 28 is open and hot water flows from the hot water inlet 31, through the cavity 29 and downwardly through the passageway 22. When the closure member 108 is lowered down into watertight mating engagement with the bead 23 surrounding the inlet 28, the inlet is closed and the flow of hot water through the passageway 28 is terminated.

In addition, surrounding the base of the annular collar 24 is an annular channel 30 with a bottom to which one or more magnetic connection members 32 are mounted. The connection members 32 may be a single annular piece that snuggly fits within the annular channel 30 and may be made of either permanent magnetic material or made of ferromagnetic material.

Surrounding the annular channel 30 is an umbrella-like member (34) defining a downwardly facing cavity 36 within which a unique spray plate 38 is mounted. The umbrella 34 has a relatively narrow, annular section 40 joined to a conical section 42 that extends outwardly and downwardly away from the annular section 40 horizontal section to a cylindrical skirt section 44. These sections have relatively smooth continuous interior surfaces that face downwardly and deflect downwardly any upwardly directed splashes of hot water or steam. The circular downwardly facing opening defined by the cylindrical skirt section 44 is coextensive with the upwardly facing opening of the brew basket assembly 18 and abuts against the top edge 46 of the brew basket housing 48 of the brew basket assembly 18. Accordingly, any water striking or steam condensing on the interior surfaces of the umbrella 34 will drop down into the brew basket housing 48.

The passageway 22 has an outlet end 50 that opens into a somewhat wider cylindrical mounting cavity 52. The cylindrical mounting cavity 52 has a downwardly facing opening 54 formed in a downwardly facing wall 56 that is aligned with the annular horizontal section. A central upstanding inlet core 58 of the spray plate is slideably received through the opening 54 and releasably held in a fully inserted position by magnetic attraction of the magnetic connector member 32 with magnetic connector members 60 mounted at the tops of a pair of hollow, upstanding, cylindrical mounting posts 62 of the spray plate 38. If both the magnetic connector member 32 and the magnetic connector member 60 are permanent magnets then they are mounted so that their opposite poles, either positive and negative or negative and positive, are located adjacent each other in mutual attractive relationship. Otherwise, one of the magnetic connector members 32 and 60 is a permanent magnet and the other one of the magnetic connector members 32 and 60 is a ferromagnetic material that is magnetically attracted to the permanent magnet. Because the magnetic connector members 32 are annular magnetic attraction occurs independently of the relative angular relationship of the upper section 20 and the distribution plate 38. No effort is needed to align the magnetic connector members 62 with the magnetic connector members 32.

In any event, once the splash plate 38 is located in the operative position relative to the upper section 20 with the central inlet core fully inserted within the cylindrical mounting cavity 52 and the top of upstanding annular post 62 abutting the bottom of the annular channel 30, as shown in FIG. 2, the mutual magnetic attraction of the magnetic connector members 32 and 60 releasably holds the splash plate in the operative position, as shown. As seen in FIG. 3, when it is desired to separate the splash plate 38 from the upper section 20, all that need be done is to separate them from one another until the central core 58 has been slid out of the cavity 52 and the magnetic connectors 32 and 60 moved sufficiently apart to break the mutual magnetic attraction. Advantageously, such separation that is needed for purposes of cleaning, repair or replacement is achievable manually without the need for any tools.

Figure 4:
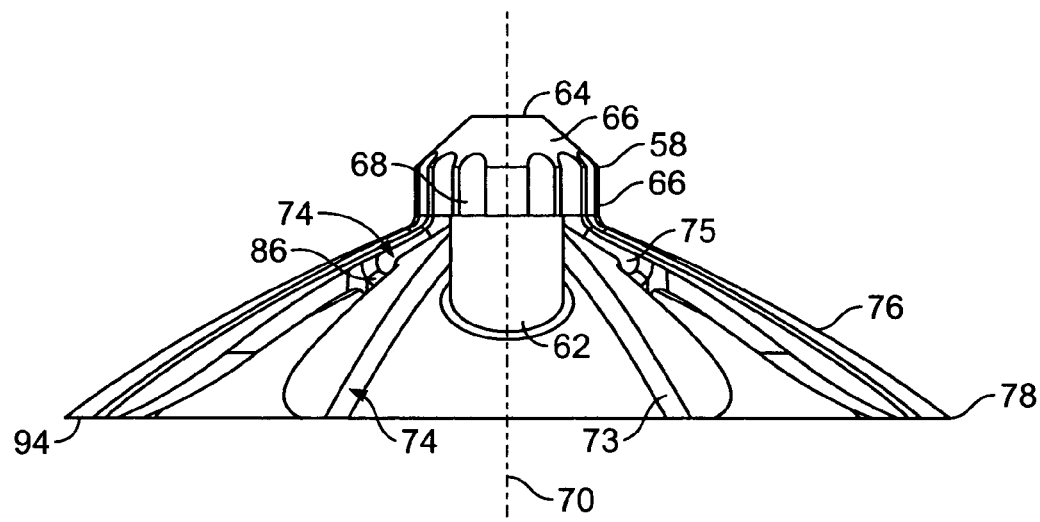
FIG. 4 is a side elevation view of the spray distribution member of FIGS. 2 and 3.
Figure 5:
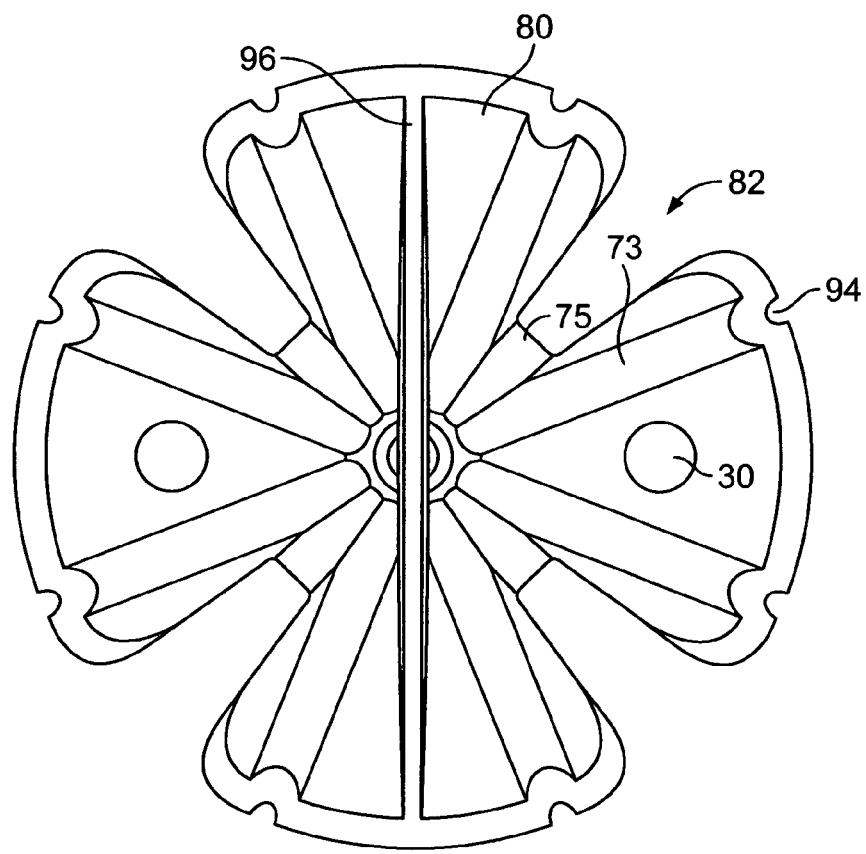
FIG. 5 is a plan view of the spray distribution member of FIG. 4.
Figure 6:
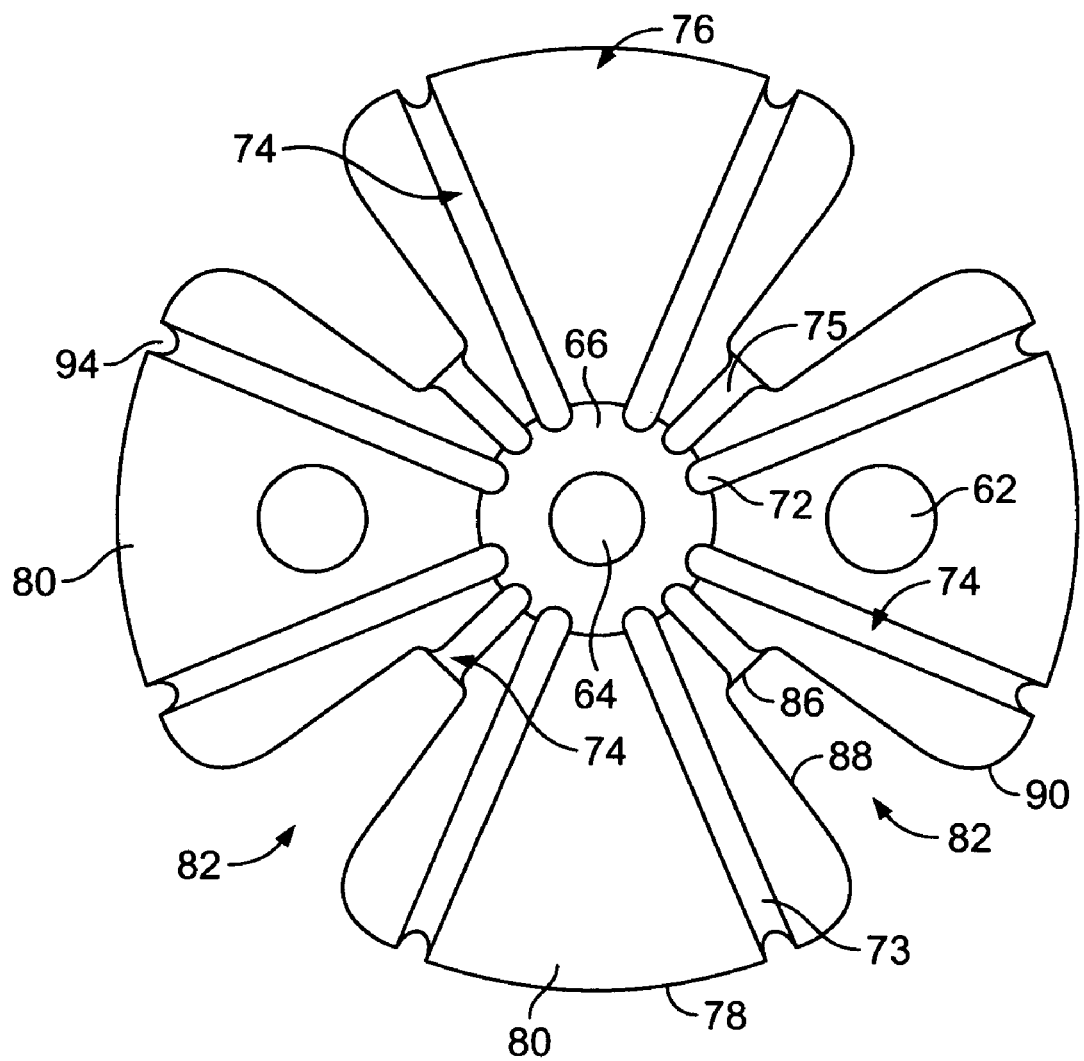
FIG. 6 is a bottom view of the spray distribution member of FIGS. 4 and 5.

Referring now to FIGS. 4, 5 and 6, the upstanding central hub 58 of the spray plate, or spray cutter is seen to have a flat, circular top 64, a generally cylindrical side wall 66 and outwardly, downwardly extending truncated generally conical section 66 joining the cylindrical side wall 66 to the top 64. The sidewall 66 has vertical grooves, or passageways, 68 that are parallel to the central axis of symmetry 70 and have inlet ends 72 facing upwardly to receive water that cascades down the side of the conical section 66 that is received in the top of the cavity 52.

Each of these downwardly extending twelve grooves 68 communicates with one of twelve radially outwardly extending mating grooves, or passageways, 74 formed in a truncated, generally conical distribution plate 76. While the distribution plate may be perfectly conical, preferably it is slightly outwardly curved. The distribution plate 76 extends radially outwardly and downwardly from the hub 58 to the outer periphery 78 of the distribution plate. As best seen in FIG. 6, the outer periphery 78 is not circular but has a flower pedal like shape with four pedals 80 separated by gaps 82 that extend inwardly from the outermost part 84 of the periphery 78 to an inner location 86 spaced from the hub 58 intermediate the hub 58 and the outermost part 84. Each of the four gaps 82 has an inner relatively narrow portion adjacent the inner location 86 joined to the distal outlet end of one of four relatively shorter ones 75 of twelve grooves 74. The gaps 82 are all the same size and are equally spaced around the hub 58. The gaps 82 have symmetrical opposite tapered sides 88 that are tapered outwardly from each other and merged with outwardly curved sections 90. The outwardly curved sections 90 merge with and join the outermost part 84 of the pedals 80 on opposite sides of the gap 82 with the tapered sides 88.

Each gap 82 has one associated shorter one 75 of the groves 74, and each of the pedals 80 has two relatively longer ones 73 of the grooves 74 located adjacent opposite sides 92 of the pedals 80. Each of the longer grooves terminates relatively flat undercut bottom 94 that creates a downwardly facing groove outlet 94.

Referring to FIGS. 5 and 2, a handle 96 extends downwardly from the top of the hub 58 to the level of the flat bottom 94 and extends diametrically across the generally conical distribution plate 76 between the centers of two of the opposite pedals 80. This divides the interior underside of the distribution plate 38 into two equal parts and enhances the structural rigidity of the generally conical distribution plate 38. The handle 96 also function as a dividing wall prevents water from the relatively short grooves 75 from passing from one side of the dividing wall 96 to the other side of the dividing wall 96.

The handle 96 may be manually grasped to pull the distribution plate 76 downwardly from the releasable connection with the upper section 20 or to move it upwardly into the operative position shown in FIG. 2. Advantageously, the handle being aligned with the center of the distribution plate 38 has at least a central section that is inside of and spaced from the main streams of hot water being distributed. Accordingly, the maximum temperature of the handle 95 is relatively reduced so that it does not become too hot to handle.

In accordance with one aspect of the invention, the handle 96 is used for another important cleaning function that does not require separation of distribution plate 38 from the upper section. Instead, any lime encrustation or crystallized coffee oils or the like that may form at the sides of the vertical grooves 68 and on the interior surface of the mounting cavity 52 may be removed by simply manually rotating the distribution plate 38 while the hub 58 remains mounted in the operative position snuggly received within and abutting the interior surface of the mounting cavity 52. Such rotation is preferably achieved by grasping the handle and using it to manually effect the rotation. Preferably, the rotation is performed with a vigorous, but relatively short-stroke, "back and forth" motion in which the direction of rotation is repeatedly reversed. Such back and forth movement scrapes the lagging ones of the outermost side edges of the grooves 68 against the interior surface and thereby scrapes the lime deposits, etc. off of the interior surface to fall out of the mounting cavity 52 and out through the bottom outlets of the grooves and down the upper surface of the distribution plate 38 to fall of the edge of the distribution plate. Alternatively, the rotation is only in one direction but is trough a sufficient radial angle to insure that at least one lagging edge has scrapped over a lime deposit location. In addition to scrapping, the rotary movement also breaks any mechanical bond that may have been formed by deposits joining side edge of the grooves 68 to the interior surface of the cavity 52 which will causes pieces of deposits to break off and thereby weaken the structural integrity of any deposits still remaining. Importantly, this relative rotary movement while still assembled is enabled by the magnetic mounting that employs an annular magnetic element 32 and a magnetic connection that permits such relative rotary movement.

During operation, water under generally uniform pressure is passed through the passageway and into the cylindrical mounting cavity in the space above the top 64 of the hub connection cavity 52. This water is channeled downwardly through the vertical grooves 68 and into the mating radially extending grooves 74. Unlike the grooves 68 within the cylindrical cavity 52 that are closed by the snug fit with the interior surface of the ace of the cavity 52, the upwardly facing grooves 74 are not closed and may overflow the banks of the grooves 74, particularly the relatively long grooves 73, in which case the water may flow down the curved, generally conical upper surface 98 of the pedals between the relatively long grooves 73 to the peripheral edge 78 and may also overflow from the relatively long grooves 73 and off the sides 88 and 90 of the gaps 82. Water that does not overflow remains in the grooves and exits at the groove outlets 94 or, in the case of the relatively short grooves 75, flows off the innermost edge of the gaps 82.

It has been found that this spray distribution assembly has numerous advantages over known spray heads. First, the water is more evenly distributed for once the passes from the vertical grooves the water is no longer under pressure and the velocity and flow of the water is more controlled by gravity and the shape and configuration of the rounded but generally conical surface of the distribution plate 38. Accordingly, the speed and kinetic energy of each of the water droplets as they impact the top surface of the beverage ingredient within the brew basket assembly 18 to reduce agitation of the ingredient and resultant splatter. While there are some small streams created, the overall effect is to create beneath the distribution plate 38 a generally distributed "cloud" of water droplets.

Importantly, unlike spray heads that rely upon a spray plate with a plurality of relatively small holes are highly susceptible to clogging due to calcification liming or other mineral deposits, the top surface of the distribution plate 38 including the grooves 74 and the open outlet ends of the grooves 74 and the gaps 82 are not relatively subject to clogging due to deposits. As noted above, clogging of the vertical grooves 68 in the hub is eliminated by the relative rotary cleaning movement of the distribution plate 38 while still mounted in operative position.

Generally, because of the rounded conical shape of the distribution plate 38 any lime or the like is simply washed off the relatively wide and open surfaces so that the distribution plate is generally self-cleaning. However, should the distribution plate 38 or the upper section 20 require cleaning, they may be easily separated for cleaning and the cleaning may be effected easily due to the lack of any small holes or other surfaces difficult to access for cleaning purposes. In keeping with an important aspect of the invention, unlike known spray heads that require tools for separation, separation may also be easily made for purposes of repair or replacement as noted above with respect to use of the handle 96.

The approximate width of the spray plate is three inches and the width of the grooves 74 is approximately one-tenth inch. It is preferably made from a molded plastic having a non-adhesive characteristics or metal such as stainless steel coated with a material having such a non-adhesive characteristics. Any such coating or material should be approved by the FDA to be safe for use in contact with food for human consumption. Preferably, the material used for the outer surface coating has a coefficient of friction less than that of the stainless steel. Preferably, the material of the outer surface coating 68 is a synthetic, non-corrosive material, such as a fluoropolymer that is approved for contact with human food can be readily painted or applied as a strong adhering coating to stainless steel and which will maintain integrity at near boiling temperatures while in contact with water. Preferably, the coating is made of TECHNOLOGY TEFLON® self-priming, one-coat blend of fluoropolymer (420-104 Gray) with other resins of the type used on coffee plate warmers, assorted food-processing utensils, clothes-iron, sole plates and portable sandwich makers, or the like, and having a cure temperature of approximately 752-degrees Fahrenheit and a service temperature of approximately 500-degrees Fahrenheit made by DuPont™. The thickness 70, FIG. 6, of the outer surface coating is approximately 0.001-inch although thinner coating may still function well but can be more easily scratched away from the outer surface of the base.

Figure 7:
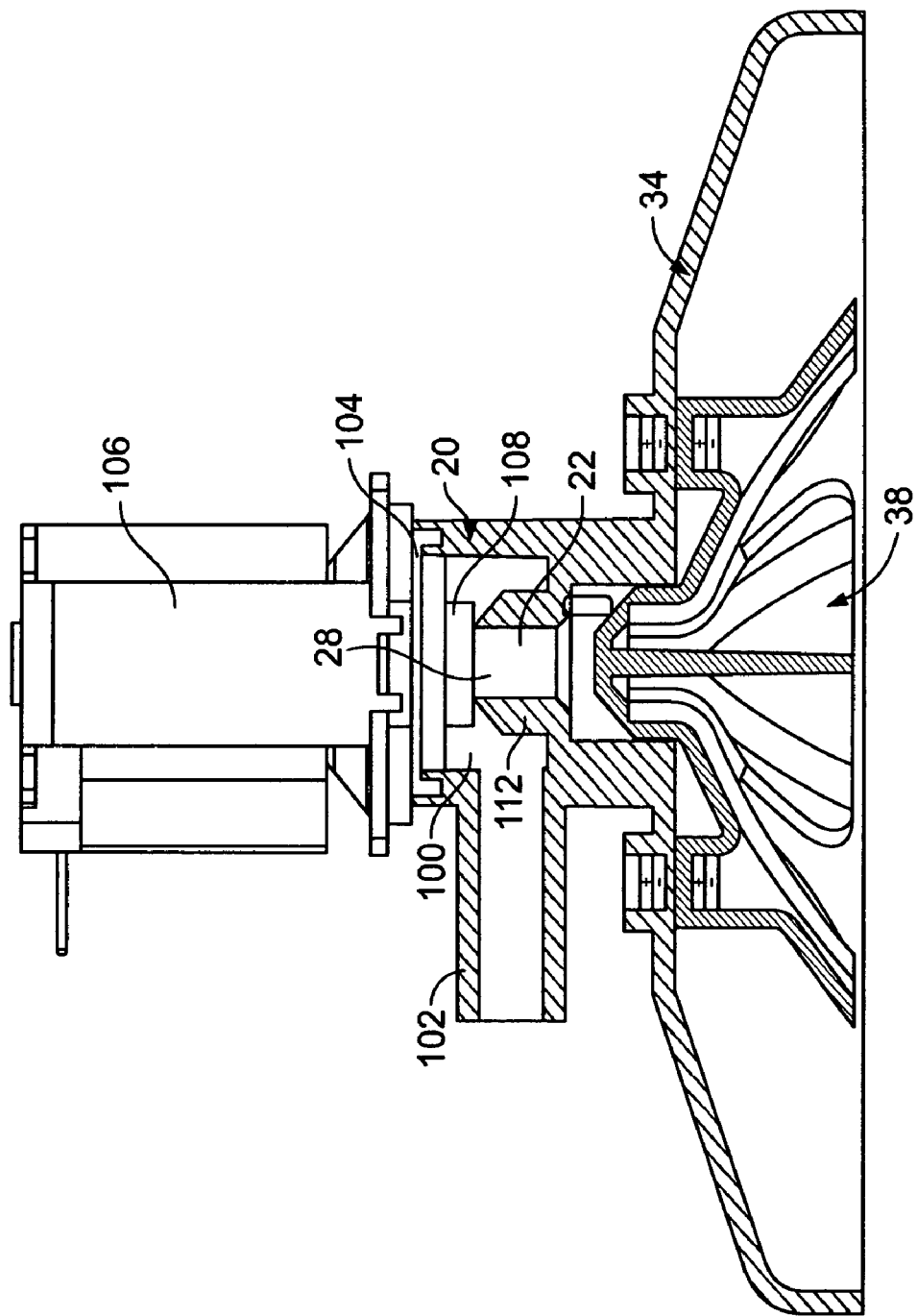
FIG. 7 is a sectional side view similar to that of FIG. 2 but illustrating connection to the water dispense system and to a solenoid controlled valve with the valve in a closed position.
Figure 8:
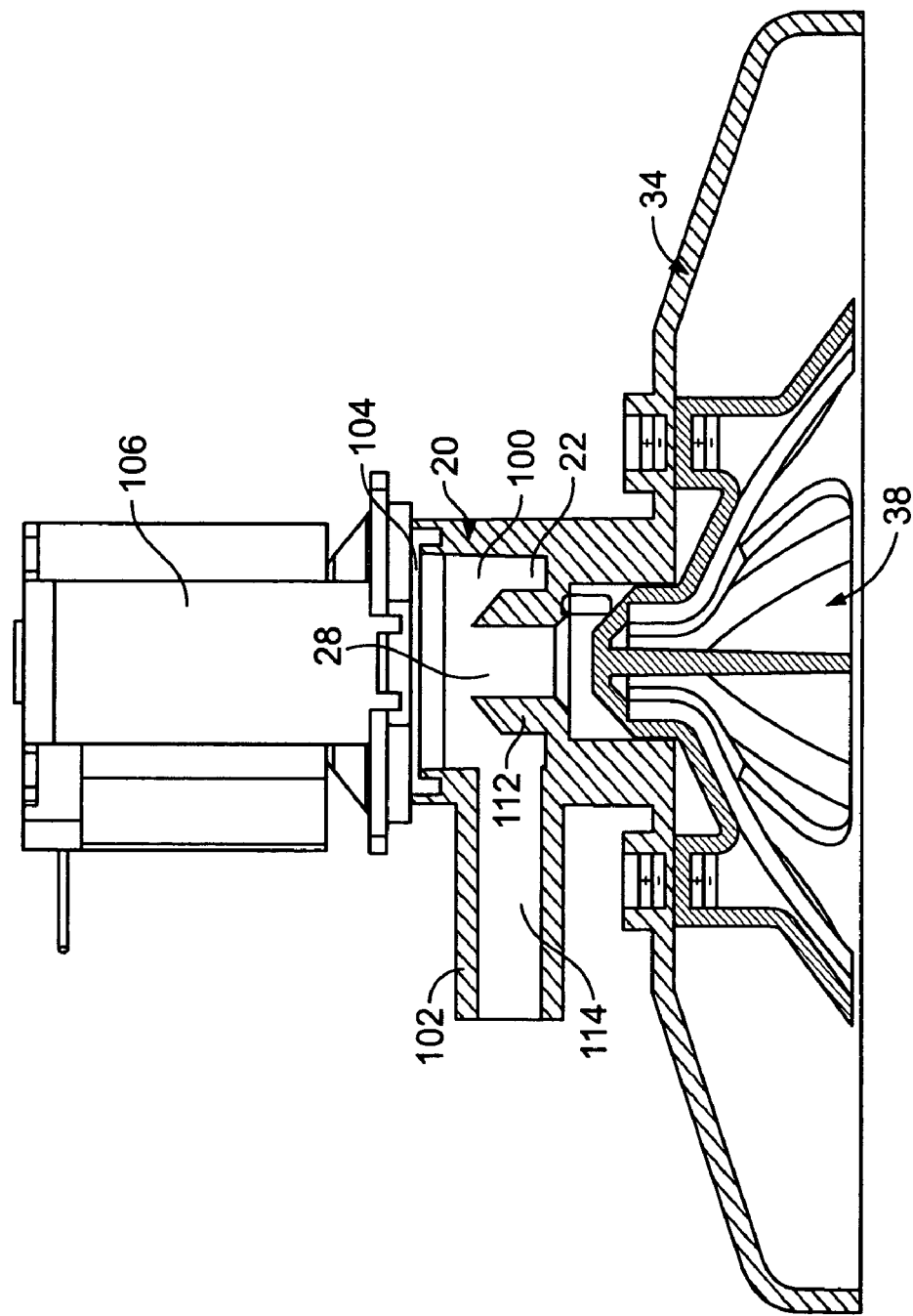
FIG. 8 is a sectional side view similar to that of FIG. 2 but illustrating connection to the water dispense system and to a solenoid controlled valve with the valve in an open position.

Referring to FIGS. 7 and 8, preferably the water enters into the passageway 22 from a closed cavity 100 that is fed water via a radially extending nipple 102 connected to a drain hose from the hot water tank of the hot water dispense system. The top of the cavity 100 is closed by a mounting plate 104 of a solenoid-controlled valve 106. The solenoid-controlled valve is controlled by the controller 16 to selectively close and open the inlet 28 to the passageway 22. As seen in FIG. 7, when the solenoid controlled valve is open, a plunger with a closure member 108 at the distal end is moved into a closed position in which the closure member 108 is pressed against the inlet 28 to block water from entering into the passageway 22 from the cavity 100. As seen in FIG. 8, when the solenoid is open, the closure member 108 is raised away from the inlet 28 to a position spaced from the inlet 28 to open the passageway 22 for entry and passage of water entered into the cavity 100 through the nipple 102. With this side water entry arrangement, the cylindrical 112 is located in advantageously positioned directly opposite the nipple opening 114 to deflect and reduce the momentum of the stream of hot water being introduced to the cavity 100 so that the rate water enters into the inlet 28 is based on the water pressure alone and not on the speed of the inlet flow.

Figure 11:
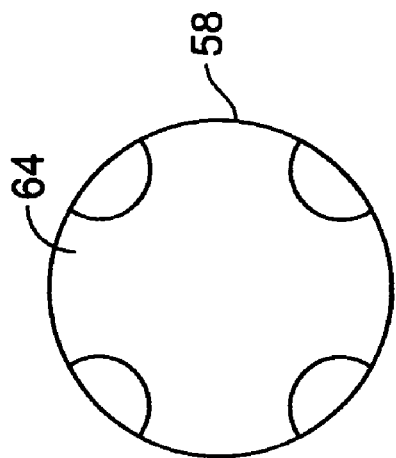
FIG. 11 is a schematic view of a hub like that of FIG. 2 but illustrating an alternative pattern for the vertical channels formed in the hub that may be used in lieu of the groove patterns of FIGS. 2 and 8 when a relatively larger volume of water is being distributed.
Figure 10:
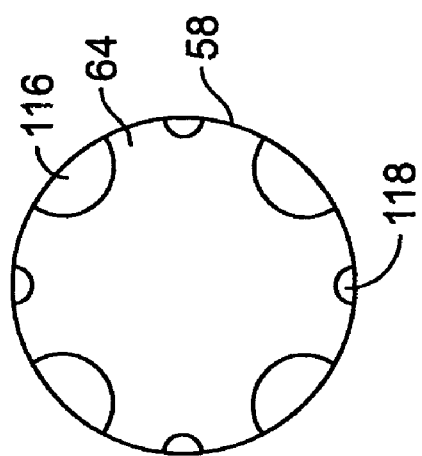
FIG. 10 is a schematic view of a hub like that of FIG. 2 but illustrating an alternative pattern for the vertical channels formed in the hub that may be used in lieu of the groove patterns of FIGS. 2 and 8 when a relatively larger volume of water is being distributed.
Figure 9:
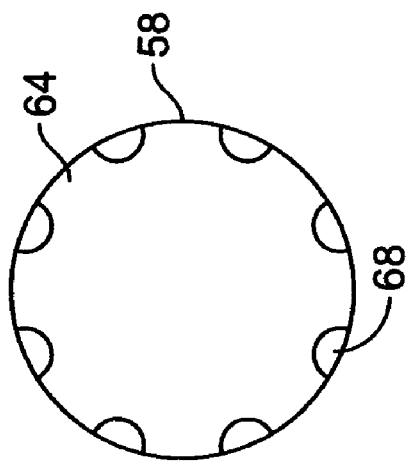
FIG. 9 is a schematic plan view of a hub like that of FIG. 2 but illustrating an alternative pattern for the vertical channels formed in the hub that may be used in lieu of the groove pattern illustrated in FIG. 2.

Referring now to FIG. 9, different patterns and sizes of the vertical grooves may successfully employed. In the pattern shown in FIG. 9, there are only eight groves and two grooves are assigned to each petal 80. In FIG. 10, there are four relatively large vertical grooves 116 that are branched into two relatively long grooves 73 on each petal 80 and four relatively small vertical grooves 118 are matched to fee four short grooves 75. In FIG. 11, there are only four large groves 116 and each one feeds two long grooves 73 on a petal and one short groove feeding a relatively short groove 75. The patterns of FIGS. 10 and 11 may be more suitable for higher rates of flow than the rates best employed with the patterns of FIGS. 2 and 9.

While a particular embodiment of the invention has been disclosed in detail, it should be appreciated that many variation may be made without departing from the scope of the invention as defined in the appended claims. For example, while the distribution plate has been shown with only four petals 80; it is believed that a similar distributions plate with more, such a eight, and perhaps fewer, such as three, could also be successfully employed. Also; while magnetic elements are preferably used to releasably secure the spray distributor member in operative relationship with the spray head for tooless attachment and removal, other means may be used for such tooless, releasable attachment such as the use of frictional mounting tabs or other friction enhancing member to provide a releasable frictional attachment such as shown and described in U.S. provisional patent application 60/474, 088 filed May 28, 2004, which is hereby incorporated by reference. Also, for instance, the central hub 58 could be externally threaded to screw into the cylindrical mounting cavity provided with matching internal screw threads or they could be attached by other manually operable fasteners that do no require the use of tools or any other tooless fastening means. Also, while the preferred form of the splash plate has the pedal-like configuration as shown a configuration in which the edge of the plate extends to a circular circumference while the radiating channels terminated in large openings at different radial distances, as shown in the aforementioned provisional patent that is incorporated herein. Reference should therefore be made to the appended claims and obvious functional equivalents of the various elements and features of the invention.

The invention claimed is:

1. In a beverage brewer having a source of hot water, a hot water dispense system, a brew basket for holding ingredient to be mixed with the hot water to make a freshly brewed hot beverage and a controller for controlling the delivery of hot water from the hot water dispenser system to the brew basket, the improvement being a spray distribution assembly, comprising:
  a spray head having a generally vertical passageway connectable with the hot water dispense system for receipt of hot water; and
  a spray plate with
    an umbrella-like body with a downwardly, outwardly tapered top with radiating, outwardly, downwardly directed, upwardly facing grooves, and
    an upwardly standing central core snuggly received within the passageway, said core having an upwardly facing top, a bottom joined to the top of the umbrella-like body and a plurality of radially, outwardly facing grooves extending from the top to the bottom to form a plurality of peripheral closed channels for passing hot water from the top of the core to the top surface of the umbrella-like body.

2. The brewer of claim 1 in which each of the plurality of channels of the core is joined with at least one of the upwardly facing grooves of the umbrella-like body.

3. The brewer of claim 1 in which at least one of the plurality of channels of the core is joined with a plurality of upwardly facing grooves.

4. The brewer of claim 1 in which the umbrella-like body has a surrounding outer edge that varies in radial distance from the core around a periphery of the umbrella-like body.

5. The brewer of claim 1 in which the umbrella-like body has a plurality of radially extending pedals separated by a plurality of slots.

6. The brewer of claim 1 in which all the plurality of upwardly facing grooves of the umbrella-like body extend from an inlet at the core to a distal outlet from which water passes out of the groove, and some of the upwardly facing grooves of the umbrella-like body have a length that is different from the length of some other upwardly facing grooves.

7. The brewer of claim 1 in which the umbrella-like body has an upwardly facing surface that has a downwardly, outwardly curved surface.

8. The brewer of claim 1 in which the umbrella-like body has a downwardly, outwardly tapered surface with a downward taper that is greater at a distance spaced from the core than that adjacent to the core.

9. The brewer of claim 1 in which the spray head has a downwardly, outwardly extending wall with a peripheral edge joinable to the periphery of an open top of a brew basket and surrounding the umbrella-like body in spaced relationship.

10. The brewer of claim 1 in which the spray head has a downwardly, outwardly extending wall with a periphery having a width that is on the order of two times that of a widest dimension of the umbrella-like body.

11. The brewer of claim 1 in which the spray head and the spray plate respectively carry mating connector means for releasable tooless securing of the central core within the passageway.

12. The brewer of claim 1 in which at least one of the spray head and the spray plate has means for carrying a magnetic material for magnetically securing together the spray head and the spray plate.

13. The brewer of claim 1 in which the spray head has a wall surrounding an inlet to the passageway to define a water cavity and means for permanently connecting the hot water dispenser system to the water cavity to provide the cavity with water and means for selectively closing the inlet.

14. The brewer of claim 1 in which the passageway has an inlet and the spray head has means for attachment of a solenoid controlled valve with a movable closure member for selectively closing and opening the inlet to the passageway.

15. The brewer of claim 1 in which
the outwardly facing grooves of the core have edges and the passageway has a relatively smooth, cylindrical surface, and including
means for releasably holding the core within the passageway enables the core to be rotated back and forth within the passageway to scrape the edges of the outwardly facing grooves against the interior surface of the passageway to remove liming residue without removal of the core from within the passageway.

16. The brewer of claim 1 in which the passageway has a sidewall surrounding the passageway and a water inlet in the sidewall and the passageway.

17. The brewer of claims 1 in combination with a brewer having a source of hot water, a hot water dispense system, a brew basket for holding ingredient to be mixed with the hot water to make a freshly brewed hot beverage and a controller for controlling the delivery of hot water from the hot water dispenser system to the brew basket.

18. For use in a beverage brewer having a source of hot water, a hot water dispense system, a brew basket for holding ingredient to be mixed with the hot water to make a freshly brewed hot beverage and a controller for controlling the delivery of hot water from the hot water dispense system to the brew basket, a method of spray distribution, comprising the steps of:
passing hot water from the dispense system to a spray head having an inwardly facing interior surface;
passing the hot water from the spray head through a plurality of closed water channels defined by the interior surface of the spray head and radially, outwardly facing grooves formed in an upwardly standing central core snuggly received within the interior surface of the spray head passing hot water from the plurality of closed water channels to a plurality of upwardly facing radiating open grooves formed in a downwardly, outwardly tapered top surface of an umbrella-like body centrally attached to the upwardly standing central core; and
passing hot water from the upwardly facing grooves to the brew basket.

19. The method of claim 18 including the step of passing hot water along the upwardly facing grooves of the umbrella-like body of different length to a surrounding outer edge that varies in radial distance from the core around a periphery of the umbrella-like body.

20. The method claim 18 including the step of passing hot water along a top surface of the umbrella-like body by different amounts on a plurality of radially extending pedals separated by a plurality of slots and to inner edges of the plurality of slots.

21. The method of claim 18 in which all the plurality of upwardly facing grooves of the umbrella-like body extend from an inlet at the core to a distal outlet from which water passes out of the groove, and some of the upwardly facing grooves of the umbrella-like body have a length that is different from the length of some other upwardly facing grooves, and including the step of passing the hot water along the grooves of different length.

22. The method of claim 18 in which the umbrella-like body has an upwardly facing surface that has a downwardly, outwardly curved surface, and including the step of passing the hot water along a path on said outwardly curved surface.

23. The method claim 18 in which the umbrella-like body has a downwardly, outwardly tapered surface with a downward taper that is greater at a distance spaced from the core than that adjacent to the core and including the step of passing hot water more quickly at locations further from core than location closer to the core.

24. The method of claim 18 in which the spray head has a downwardly, outwardly extending wall with a peripheral edge joinable to the periphery of an open top of a brew basket and surrounding the umbrella-like body in spaced relationship and including the step of passing water off of a peripheral edge in spaced relationship from the periphery of the brew basket.

25. The method of claim 18 in which the spray head has a downwardly, outwardly extending wall with a periphery having a width that is on the order of two times that of a widest dimension of the umbrella-like body and including the step of passing some of the water in a downward, outward direction to locations in the brew basket between the periphery of the wall and an interior sidewall of the brew basket.

26. The method of claim 18 including the step of releasably securing or separating the central core within the passageway by means of tooless securing means.

27. The method of claim 18 in which the spray head has a wall surrounding an inlet to the passageway to define a water cavity, and
including the steps of
filling the water cavity with hot water under pressure, and
selectively opening the inlet of the passageway to pass water from the water cavity while the cavity is substantially filled with water.

28. The method of claim 18 in which the passageway has a sidewall surrounding the passageway and including the step of passing water into the passageway through a water inlet in the sidewall.

29. For use in a beverage brewer having a source of hot water, a hot water dispense system, a brew basket for holding ingredient to be mixed with the hot water to make a freshly brewed hot beverage and a controller for controlling the delivery of hot water from the hot water dispenser system to the brew basket, a method of spray distribution comprising the steps of
connecting a spray head having a passageway connected with the hot water dispense system for receipt of hot water and having an interior surface;
passing the received hot water to a spray plate with an umbrella-like body having an upwardly, inwardly tapered top with radiating, upwardly facing grooves through a plurality of radially, outwardly facing grooves formed in an upwardly standing central core, said central core being snuggly received within the interior surface to form water channels defined by the outwardly facing and the interior surface of the passageway, said core having an upwardly facing top, a bottom joined to the top of the umbrella-like body and the plurality of radially, outwardly facing grooves extending from the top to the bottom to form a plurality of peripheral closed channels for passing hot water from the top of the core to the top surface of the umbrella-like body; and
passing water from each of the plurality of channels of the core to at least one of the upwardly facing grooves of the umbrella-like body joined to the channel.

30. For use in a beverage brewer having a source of hot water, a hot water dispense system, a brew basket for holding ingredient to be mixed with the hot water to make a freshly brewed hot beverage and a controller for controlling the delivery of hot water from the hot water dispenser system to the brew basket, a method of spray distribution comprising the steps of
connecting a spray head having a passageway connected with the hot water dispense system for receipt of hot water and having an interior surface;
passing the received hot water to a spray plate with an umbrella-like body having an upwardly, inwardly tapered top with radiating, upwardly facing grooves through a plurality of radially, outwardly facing grooves formed in an upwardly standing central core, said central core being snuggly received within the interior surface to form water channels defined by the outwardly facing and the interior surface of the spray head, said core having an upwardly facing top, a bottom joined to the top of the umbrella-like body and the plurality of radially, outwardly facing grooves extending from the top to the bottom to form a plurality of peripheral closed channels for passing hot water from the top of the core to the top surface of the umbrella-like body; and passing hot water along at least one of the plurality of channels of the core to at least one of a plurality of upwardly facing grooves of the umbrella like body.

31. For use in a beverage brewer having a source of hot water, a hot water dispense system, a brew basket for holding ingredient to be mixed with the hot water to make a freshly brewed hot beverage and a controller for controlling the delivery of hot water from the hot water dispenser system to the brew basket, a method of spray distribution comprising the steps of:
connecting a spray head having a passageway connected with the hot water dispense system for receipt of hot water and having an interior surface;
passing the received hot water to a spray plate with an umbrella-like body having an upwardly, inwardly tapered top with radiating, upwardly facing grooves through a plurality of radially, outwardly facing grooves formed in an upwardly standing central core, said central core being snuggly received within the interior surface to form water channels defined by the outwardly facing and the interior surface of the spray head, said core having an upwardly facing top, a bottom joined to the top of the umbrella-like body and the plurality of radially, outwardly facing grooves extending from the top to the bottom to form a plurality of peripheral closed channels for passing hot water from the top of the core to the top surface of the umbrella-like body; and
releasably securing the core within the passageway by means including magnetic material for magnetically securing together the spray head and the spray plate.

32. For use in a beverage brewer having a source of hot water, a hot water dispense system, a brew basket for holding ingredient to be mixed with the hot water to make a freshly brewed hot beverage and a controller for controlling the delivery of hot water from the hot water dispenser system to the brew basket, a method of spray distribution comprising the steps of
connecting a spray head having a passageway connected with the hot water dispense system for receipt of hot water and having an interior surface;
passing the received hot water to a spray plate with an umbrella-like body having an upwardly, inwardly tapered top with radiating, upwardly facing grooves through a plurality of radially, outwardly facing grooves formed in an upwardly standing central core, said central core being snuggly received within the interior surface to form water channels defined by the outwardly facing and the interior surface of the spray head, said core having an upwardly facing top, a bottom joined to the top of the umbrella-like body and the plurality of radially, outwardly facing grooves extending from the top to the bottom to form a plurality of peripheral closed channels for passing hot water from the top of the core to the top surface of the umbrella-like body; and
selectively opening and closing an inlet to the passageway by means of a solenoid controlled valve attached to the spray head to selectively close a water cavity in fluid communication with the passageway with a movable closure member within the water cavity for selectively closing and opening the inlet to the passageway.

33. For use in a beverage brewer having a source of hot water, a hot water dispense system, a brew basket for holding ingredient to be mixed with the hot water to make a freshly brewed hot beverage and a controller for controlling the delivery of hot water from the hot water dispenser system to the brew basket, a method of spray distribution comprising the steps of connecting a spray head having a passageway connected with the hot water dispense system for receipt of hot water and having an interior surface;

passing the received hot water to a spray plate with an umbrella-like body having an upwardly, inwardly tapered top with radiating, upwardly facing grooves through a plurality of radially, outwardly facing grooves formed in an upwardly standing central core, said central core being snuggly received within the interior surface to form water channels defined by the outwardly facing and the interior surface of the spray head, said core having an upwardly facing top, a bottom joined to the top of the umbrella-like body and the plurality of radially, outwardly facing grooves extending from the top to the bottom to form a plurality of peripheral closed channels for passing hot water from the top of the core to the top surface of the umbrella-like body; and rotating the core while within the passageway to scrape edges of the outwardly facing grooves against an interior, smooth cylindrical surface of the passageway to remove liming residue while continuing to releasably holding the core within the passageway by releasable holding means.

34. A method of distributing hot water onto a layer of beverage ingredient within a brew basket, comprising the steps of passing hot water to a spray head; and passing hot water passed to the spray head onto a beverage ingredient within a brew basket along at least one of (a) closed passageways that are formed of two parts that may be separated for purposes of cleaning, (b) contours of a curved, convex surface; and (c) contours of a surface that tapers downwardly at an increasing taper as the distance from a central location increases.

* * * * *